(12) United States Patent
Shono

(10) Patent No.: US 7,287,059 B2
(45) Date of Patent: Oct. 23, 2007

(54) IMAGE PROCESSING APPARATUS, IMAGE PROCESSING METHOD, AND PROGRAM FOR CONTROLLING IMAGE PROCESSING APPARATUS

(75) Inventor: Hiroki Shono, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 404 days.

(21) Appl. No.: 10/281,196

(22) Filed: Oct. 28, 2002

(65) Prior Publication Data
US 2003/0084110 A1 May 1, 2003

(30) Foreign Application Priority Data
Oct. 31, 2001 (JP) ............... 2001-334703

(51) Int. Cl.
G06F 15/16 (2006.01)
(52) U.S. Cl. ...................... 709/206; 709/203
(58) Field of Classification Search ............... 709/201, 709/203, 206; 358/402, 448, 452, 537; 719/310
See application file for complete search history.

(56) References Cited

U.S. PATENT DOCUMENTS

| 5,283,856 | A | * | 2/1994 | Gross et al. ............ 706/47 |
| 5,377,354 | A | * | 12/1994 | Scannell et al. ......... 718/103 |
| 5,634,005 | A | * | 5/1997 | Matsuo ................... 709/206 |
| 5,881,233 | A | | 3/1999 | Toyoda et al. ........ 395/200.48 |
| 5,999,932 | A | * | 12/1999 | Paul ........................ 707/10 |
| 6,199,103 | B1 | * | 3/2001 | Sakaguchi et al. ....... 709/206 |

FOREIGN PATENT DOCUMENTS

| JP | 8-242326 | 9/1996 |
| JP | 9-283409 | 10/1997 |
| JP | 11-355347 | 12/1999 |
| JP | 2000-222309 | 8/2000 |
| JP | 2001-094591 | 4/2001 |

* cited by examiner

Primary Examiner—Van H. Nguyen
(74) Attorney, Agent, or Firm—Fitzpatrick, Cella, Harper & Scinto

(57) ABSTRACT

A situation such that E-mail such as spam mail with contents which the user of a printing apparatus does not desire is sent to the printing apparatus and a user's undesirable print is executed is prevented. For this purpose, whether an E-mail address of a transmitting source of the E-mail has been registered in an address book or not is discriminated. If it is not registered in the address book, this E-mail data is abandoned.

17 Claims, 10 Drawing Sheets

FIG. 6

From : hiroki@abcxyz.co.jp
To : printer@aaa.bbb.ccc.com
Date : Fri. 31 Aug 2001 19:04:55 +0900
MIME-Version : 1.0
Content-Type : text/plain ;
        charset= "iso-2022-jp"
Subject : Email Printing

FIG. 7 eeee@aaa.bbb.co.jp
ffff@ccc.ddd.ne.jp
gggg@abc.def.com
...
...
...
zzzz@xxxxxx.yyyyyy.co.jp

FIG. 8

HEADER PORTION:

Content-Type : text/plain ;
        charset= "iso-2022-jp"
Subject : #AddAddress

MAIN TEXT PORTION:

Begin
aaa@bbbb.co.jp
ccc@dddd.com
End

FIG. 9

| Subject PORTION | CONTENTS OF MAIN TEXT PORTION |
|---|---|
| #GetAddressBook | N/A |
| #AddAddress | NAME@DOMAIN |
| #ClearAddressBook | N/A |
| #DeleteAddress | Name@Domain |
| #Help | N/A |
| #AddProc | ProcedureID<br>INSTRUCTION COMMAND 1<br>SUPPLEMENTARY INFORMATION 1<br>INSTRUCTION COMMAND 2<br>SUPPLEMENTARY INFORMATION 2<br>...... |
| #StartProc | ProcedureID |
| #DeleteProc | ProcedureID |

IMAGE PROCESSING APPARATUS, IMAGE PROCESSING METHOD, AND PROGRAM FOR CONTROLLING IMAGE PROCESSING APPARATUS

BACKGROUND OF THE INVENTION

1. Field of the Invention

The invention relates to an image processing apparatus for transmitting and receiving image data in an E-mail format by using an E-mail transmission and reception system on the Internet. More particularly, the invention relates to an image processing apparatus and an image processing method for making print management by using an address book of E-mail addresses or a registering method of the address book.

2. Related Background Art

Hitherto, personal computers (PCs) are connected to a network such as Internet or the like and E-mail is transmitted and received between the computers. The E-mail is transmitted and received in accordance with an E-mail address owned by every user. After the transmitted E-mail is once accumulated into a mail server on the Internet, on the basis of a user ID or a password which has been preset in the PC, the mail server transfers the E-mail whose transmitting destination is set to the E-mail addresses corresponding to the user ID to the PC.

A printing apparatus for transmitting and receiving print data by using the foregoing E-mail system, developing image data, and printing it has been known. For example, as proposed in JP-A-8-242326, a facsimile apparatus such that image data constructed in an E-mail format is communicated by E-the mail via the Internet has been considered.

In such a printing apparatus using the E-mail system, in order to allow the E-mail to be managed in the printing apparatus, there is a method whereby the apparatus has an address book in which a plurality of E-mail addresses can be registered. For example, as proposed in the Official Gazette of Japanese Patent Application No. 9-283409, a printing apparatus having a mechanism for automatically registering the E-mail addresses has been known. According to such a printing apparatus, if E-mail data is received, address extracting means in an address book management unit extracts an E-mail address of a transmitting source from a header of the E-mail data. If the extracted E-mail address is not registered in the address book, address registering means in the address book management unit allows the E-mail address to be stored into the address book.

SUMMARY OF THE INVENTION

However, since the E-mail has a nature such that it is used mainly on the Internet, in a printing apparatus using the conventional E-mail system, print data which is transmitted and received in the E-mail format is also often sent via the Internet. In such a case, there is a case where the printing apparatus receives E-mail such as spam mail with generally unwelcomed contents and prints on the basis of such E-mail.

Particularly, in an Internet environment, unless security such as a firewall or the like is established, it is impossible to restrict access. Even in the case where the security is established between the Internet and LAN (Local Area Network) environments, the E-mail is often transmitted and received without being restricted.

The invention is made in consideration of such a situation and it is an object of the invention to provide an E-mail printing apparatus having excellent operability which can prevent a situation such that E-mail such as spam mail or the like with contents which the user of the printing apparatus does not desire is sent to the printing apparatus and print which the user does not desire is executed.

BRIEF DESCRIPTION OF THE DRAWINGS

FIG. 6 is a diagram showing an example of a header of E-mail data;

FIG. 7 is a diagram showing a construction of an address book 216;

FIG. 8 shows an example of a format of E-mail data for registration into the address book;

FIG. 9 is a diagram showing an example of a list of syntax for operating the address book 216 of the printing apparatus;

DETAILED DESCRIPTION OF THE PREFERRED EMBODIMENT

An embodiment of the invention will be described hereinbelow with reference to the drawings.

Figure 1:
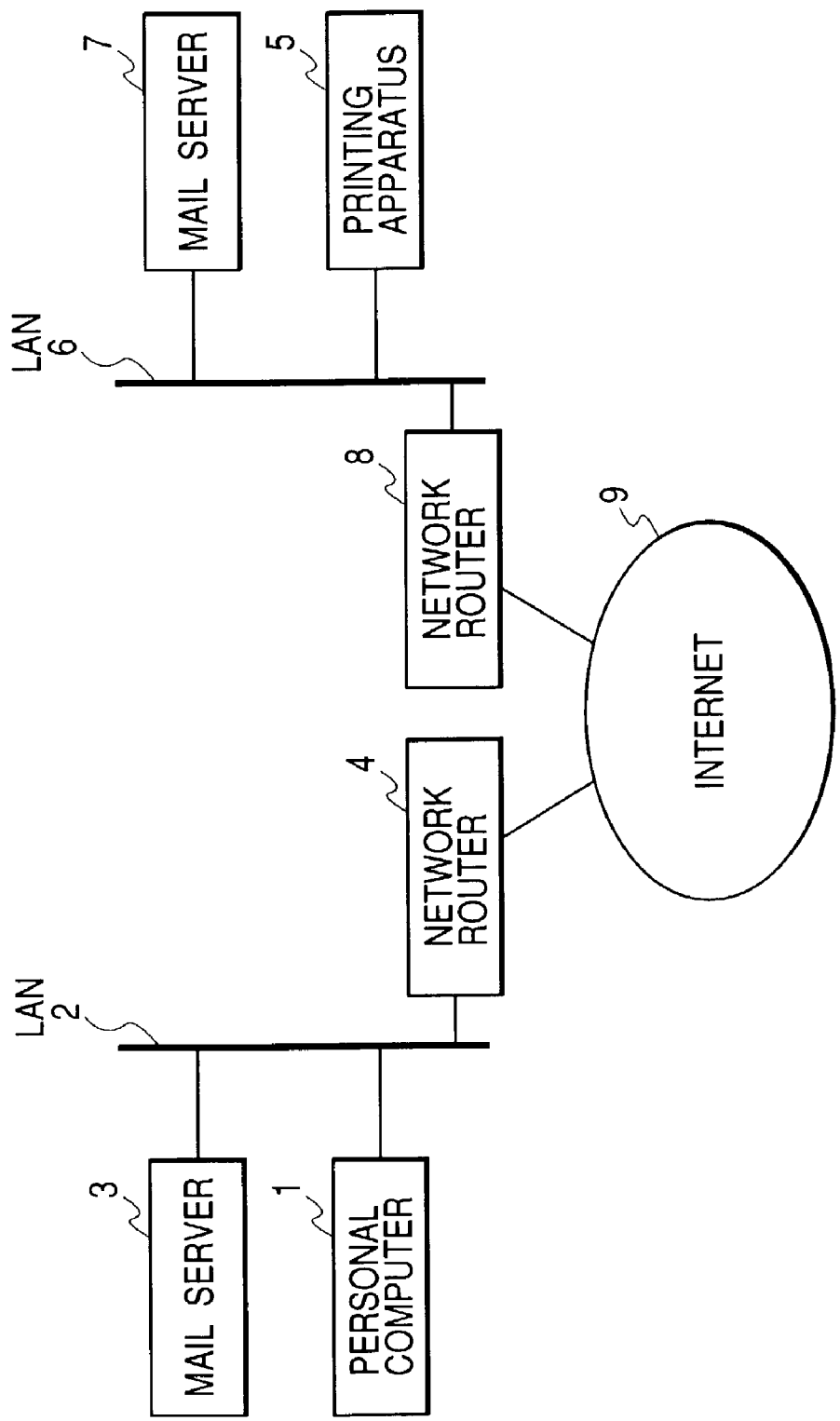
FIG. 1 is a diagram showing a whole construction of an E-mail print system.

FIG. 1 is a diagram showing a whole construction of an E-mail print system which is presumed in the embodiment. A personal computer (PC) 1 serving as a transmission side of E-mail is connected to a mail server 3 and a network router 4 via a local area network (LAN) 2 so that it can communicate with them.

In the embodiment, a printing apparatus 5 is presumed as a reception side of the E-mail. The printing apparatus 5 as a reception side of the E-mail is a laser printer, a digital hybrid apparatus, or the like and connected to a mail server 7 and a network router 8 in an office via an LAN 6 so that it can communicate with them in a manner similar to the personal computer 1 on the transmission side.

The personal computer 1 and the printing apparatus 5 are constructed so that E-mail can be transmitted and received via an Internet 9 through the network router 4 connected to the LAN 2 and the network router 8 connected to the LAN 6, respectively. The mail servers 3 and 7 function as a POP3 server (Post Office Protocol Server) and an SMTP server (Simple Mail Transfer Protocol Server).

The printing apparatus 5 may be an image processing apparatus such as laser beam printer, ink jet printer, copying apparatus, hybrid apparatus (multifunction apparatus), FAX apparatus, or the like.

Figure 2:
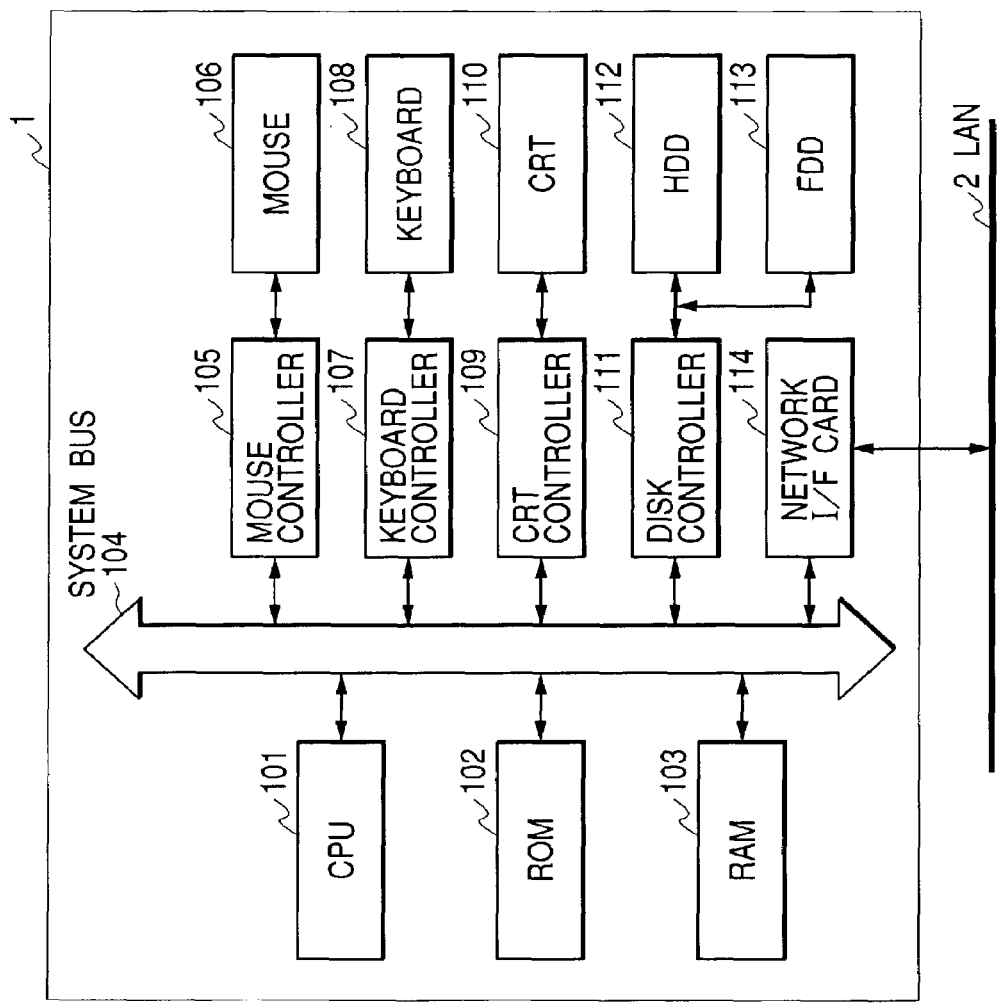
FIG. 2 is a diagram showing a construction of a personal computer 1.

Subsequently, a construction of the personal computer 1 on the transmission side will be described. FIG. 2 is a diagram showing the construction of the personal computer 1. The personal computer 1 is constructed so that it can transmit E-mail by the construction as shown in, for example, FIG. 2.

The personal computer 1 comprises: a CPU 101 for controlling the whole operation of the PC; an ROM 102 in which various programs for controlling the operation in the CPU 101, data, and the like are stored; an RAM 103 including a main memory, a work area, and the like of the CPU 101; a mouse 106; a mouse controller 105 for controlling an instruction input from the mouse 106; a keyboard 108; a keyboard controller 107 for controlling an instruction input from the keyboard 108, a pointing device (not shown), and the like; a CRT display 110; a CRT controller 109 for controlling a display on the CRT display 110; a hard disk drive (HDD) 112 and a floppy (registered trademark) disk drive (FDD) 113 for storing various programs and data (a boot program, various applications, mail editing software, a network managing program, etc.); a disk controller 111 for controlling accesses to the HDD 112 and FDD 113; and a network interface card 114 for allowing the personal computer 1 to bidirectionally transmit and receive data to/from another PC or the mail server 3 (refer to FIG. 1) via the LAN 2. Those component elements are connected via a system bus 104 so that they can communicate with each other.

Figure 3:
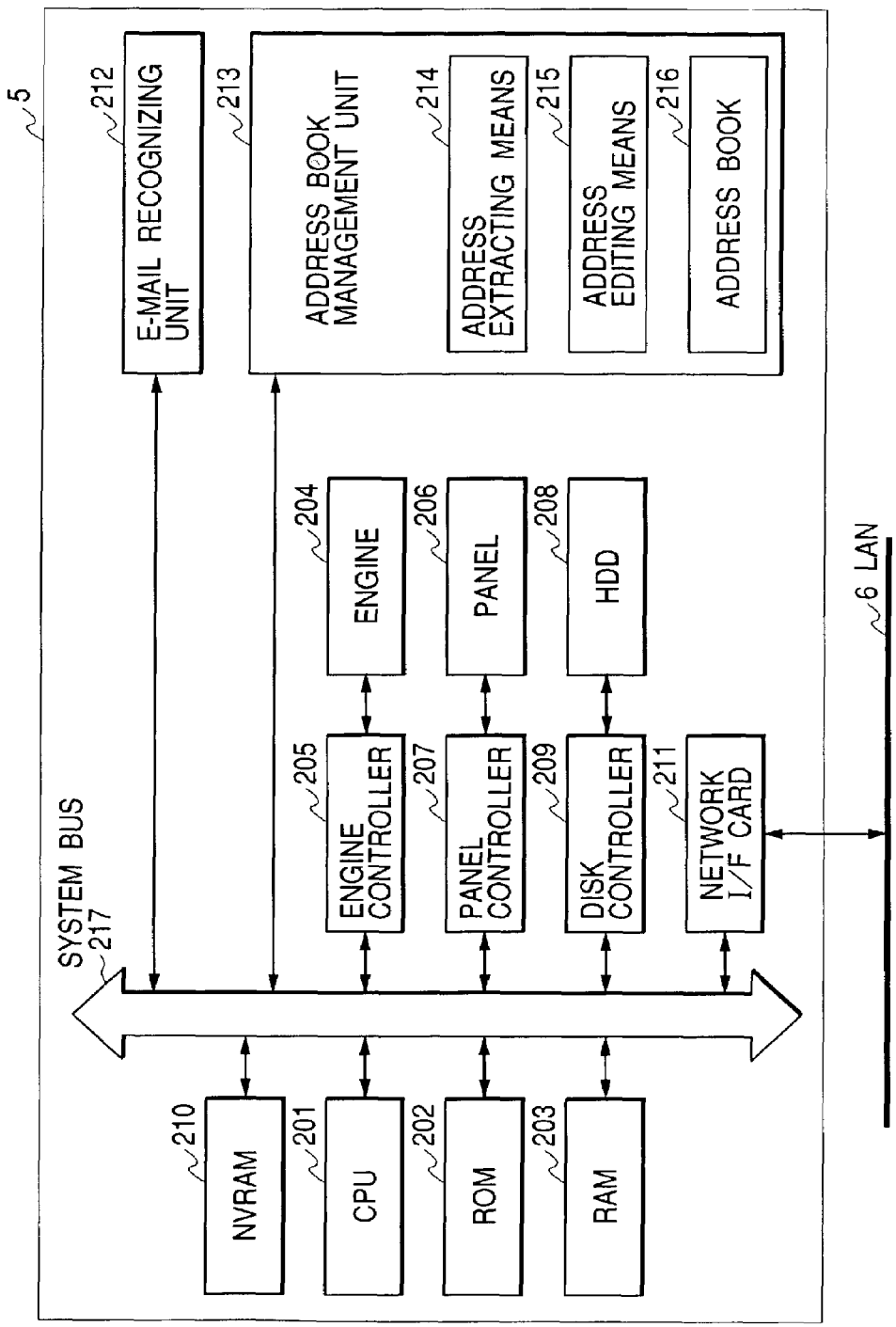
FIG. 3 is a diagram showing a construction of a printing apparatus 5.

Subsequently, the construction of the printing apparatus 5 serving as a side which receives E-mail will be described. FIG. 3 is a diagram showing the construction of the printing apparatus 5. For example, as shown in FIG. 3, the printing apparatus 5 comprises mainly: a CPU 201 for controlling the whole operation of a device; an ROM 202 in which various programs for controlling the operation in the CPU 201, data, and the like are stored; an RAM 203 including a main memory, a work area, and the like of the CPU 201; an engine 204 of a device function (a printing function, a copying function, etc.); an engine controller 205 for controlling the driving of the engine 204; an operation panel 206 for receiving various operation instructions from the user and displaying various information; a panel controller 207 for controlling an input and an output which are executed by the operation panel 206 and managing the operation panel 206; a hard disk drive (HDD) 208 for storing various programs (an address book managing program, an address discriminating program, etc.) and data (a boot program, an address book, mail editing software, a network managing program, etc.); a disk controller 209 for controlling accesses to the HDD 208; a non-volatile RAM 210; and a network interface card 211 for allowing data to be bidirectionally transmitted and received to/from the mail server 7 via the LAN 6.

When the E-mail is received, an E-mail recognizing unit 212 discriminates whether image data has been annexed to the E-mail or not. The E-mail recognizing unit 212 also has processing means for recognizing a description of a main text of the E-mail and notifying the CPU 201 of an edit command or the like of the address book included in the E-mail.

An address book management unit 213 executes a managing process regarding E-mail addresses registered in an address book 216. Particularly, the address book management unit 213 has processing means for executing a displaying process of the E-mail addresses registered in the address book 216, a process for notifying the CPU 201 of a selected E-mail address as an E-mail address of a destination, and the like. The address book management unit 213 also has address extracting means 214 and address editing means 215.

When the E-mail data is received, the address extracting means 214 extracts the E-mail address of a transmitting source shown in a header of the E-mail data. The address editing means 215 edits the address book in the case where it is determined by the E-mail recognizing unit 212 that there is an edit command of the address book, for example, registration or deletion into/from the address book with respect to contents of a message of the received E-mail.

In the embodiment, it is assumed that the address book 216 has been stored in the hard disk drive 208 and stores the registered E-mail addresses. An RAM, an EEPROM, or the like can be also used as an alternative storing apparatus of the HDD 208. Those component elements are connected via a system bus 217 so that they can communicate with each other.

<Print of E-mail>

Subsequently, an embodiment of the operation of the printing apparatus constructed as mentioned above will be described. Since the operation such that the printing apparatus transmits and receives the image data in the E-mail format to/from the LAN via the Internet is similar to that of the conventional apparatus, its description is omitted. The discrimination of the E-mail address by the address book management unit 213 and a using method of the address book 216 will be explained here.

Figure 4:
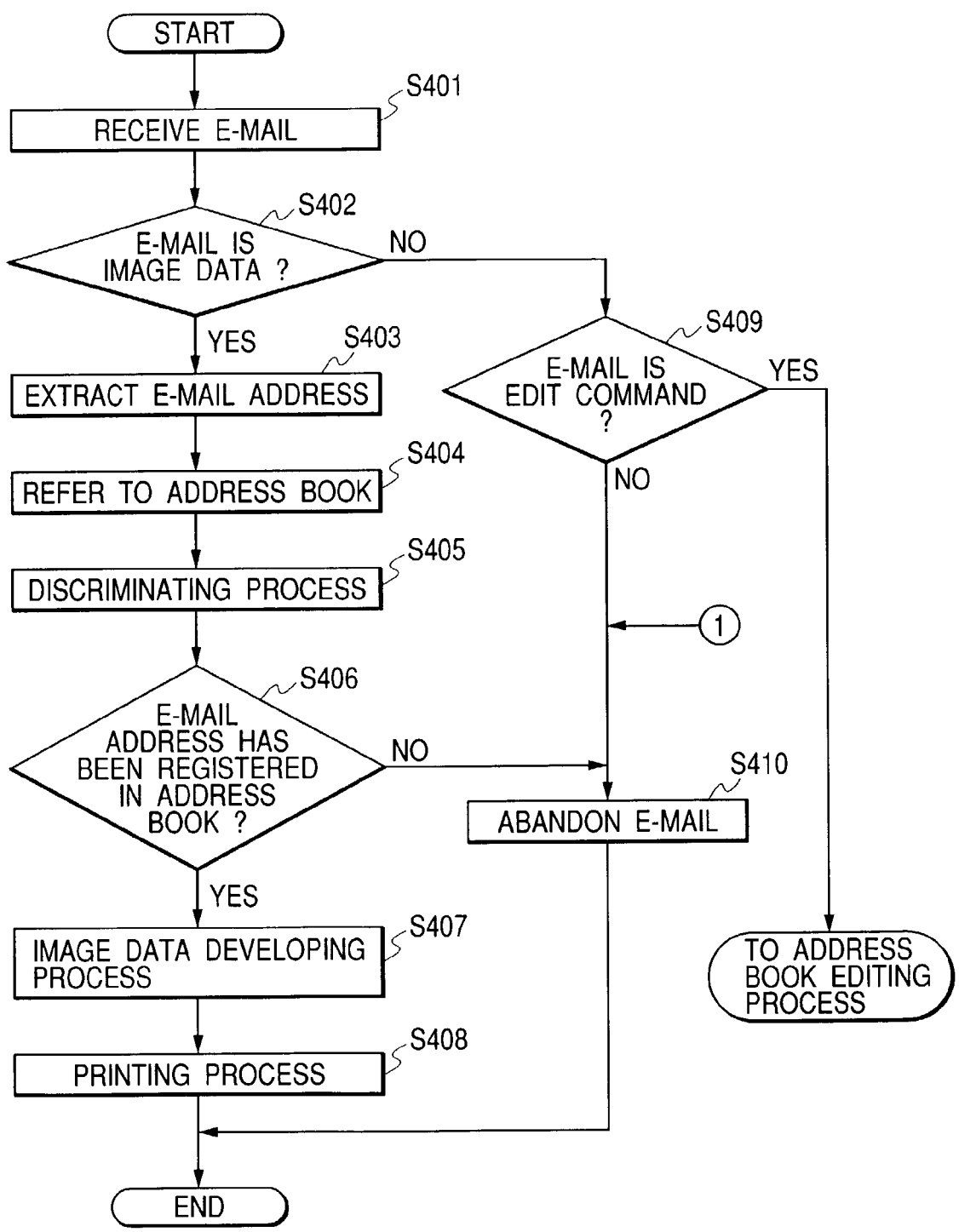
FIG. 4 is a flowchart showing a printing process of E-mail.

FIG. 4 is a flowchart showing a printing process of the E-mail which is executed by the printing apparatus 5. First, as shown in FIG. 1, the network interface card 211 of the printing apparatus 5 confirms whether the E-mail to its own apparatus has reached periodically the mail server 7 connected to the LAN 6 or not. At this time, the network interface card 211 can request the E-mail in which the E-mail address allocated to the printing apparatus 5 is set to a transmitting destination or can also request the E-mail in which the E-mail address which has been set or inputted from the operation panel 206 or the like is set to the transmitting destination.

If the E-mail to its own apparatus has arrived, the E-mail data is read into a transmission/reception data memory area provided in the RAM 203 (step S401). When the E-mail is received as mentioned above, the E-mail recognizing unit 212 executes a process for discriminating whether the received E-mail is image data or not (step S402). This discriminating process will be explained in FIG. 5.

If it is determined in step S402 that the received E-mail is the image data, an address identifying process is executed. In the address identifying process, first, the address extracting means 214 of the address book management unit 213 analyzes a header in the received E-mail data and extracts an E-mail address of the transmitting source (step S403).

FIG. 6 is a diagram showing an example of the header in the E-mail data. A character string "hiroki@abcxyz. co. jp" shown after "From:" in the header indicates the E-mail address of the transmitting source. A format of the header shown in the diagram has been predetermined as a standard of the Internet mail. Therefore, even in any E-mail, the E-mail address of the transmitting source can be certainly extracted.

Since only a "From:" field is necessary for extracting the E-mail address of the transmitting source, the address book management unit 213 does not need to analyze information of another field or a main text of the mail.

In step S403, the address book management unit 213 allows the extracted E-mail address to be stored into a space in the RAM 203. Subsequently, the address book management unit 213 compares the E-mail address extracted in step S403 with all of E-mail addresses stored in the address book 216 (step S404), thereby discriminating whether the E-mail address extracted in step S403 has been registered in the address book 216 or not (step S405).

In step S404, the address book management unit 213 reads out a list of the E-mail addresses registered in the address book 216. FIG. 7 is a diagram showing a construction of the address book 216. According to the construction, the E-mail addresses are linearly arranged. In FIG. 7, although arrangement of the E-mail addresses is set so that one E-mail address is arranged to one line for simplicity of explanation of the embodiment, a format in which they are actually stored into the HDD 208 does not depend particularly on it. For example, they can be also stored in a binary file format in place of a main text file or, as a construction of the address book, recognition numbers or the like can be also added instead of the format such that one E-mail address is arranged to one line. The E-mail addresses can be also encrypted for the purpose of improving the security.

The list of the E-mail addresses read out by the address book management unit 213 is arranged as a work area into a space in the RAM 203. Subsequently, in step S405, whether the E-mail address of the transmitting source is the address registered in the address book 216 or not is discriminated. The address book management unit 213 compares the E-mail address of the transmitting source which has temporarily been stored in the RAM 203 with the list of the E-mail addresses registered in the address book 216, thereby discriminating whether the same E-mail address as the E-mail address of the transmitting source has been registered in the address book 216 or not.

Whether the E-mail address extracted in step S403 has been registered in the address book 216 or not is discriminated (step S406). If the E-mail address extracted in step S403 has been registered in the address book 216, step S407 follows. The engine controller 205 develops the image data of the E-mail (rendering) (step S407). The engine 204 prints an image onto paper on the basis of print data formed by the rendering process (step S408). Although a detailed explanation regarding the rendering process of the image data and an outputting process of the print data is omitted here, it is assumed that they are fundamentally the same as those in the processing method of the existing laser printer or digital hybrid apparatus.

If it is determined in step S406 that the E-mail address extracted in step S403 is not registered in the address book 216, the rendering process and the printing process of the image data of the E-mail are not executed. The E-mail recognizing unit 212 abandons the E-mail data (step S410).

Subsequently, the operation which is executed in the case where the received E-mail is not the image data in step S402 will be described. When the E-mail is not the image data, the E-mail recognizing unit 212 discriminates whether the E-mail in the address book is an edit command or not (step S409).

Although details will be explained in the following embodiment, in the invention, the E-mail addresses can be edited on the basis of the E-mail data constructed in a format which has uniquely been predetermined, that is, the E-mail data for an edit of the address book.

FIG. 8 shows an example of the format of the E-mail data for registration into the address book. The E-mail data is mainly classified into a header portion and a main text portion and a data format of the main text portion can be discriminated by the header portion.

A character string "Content-type: text/plain" in the header portion shows that the main text is character code data. In the process for registering into the address book, it is necessary that the main text is the character code data. The E-mail recognizing unit 212 confirms the contents of the E-mail data of the format as mentioned above. If it is recognized that the E-mail data is the edit command of the address book, an editing operation to the address book is started.

In step S409, if the E-mail recognizing unit 212 decided that the received E-mail is not the edit command of the address book, since this E-mail is neither the image data nor the edit command of the address book, the E-mail recognizing unit 212 abandons the E-mail data (step S410).

Figure 5:
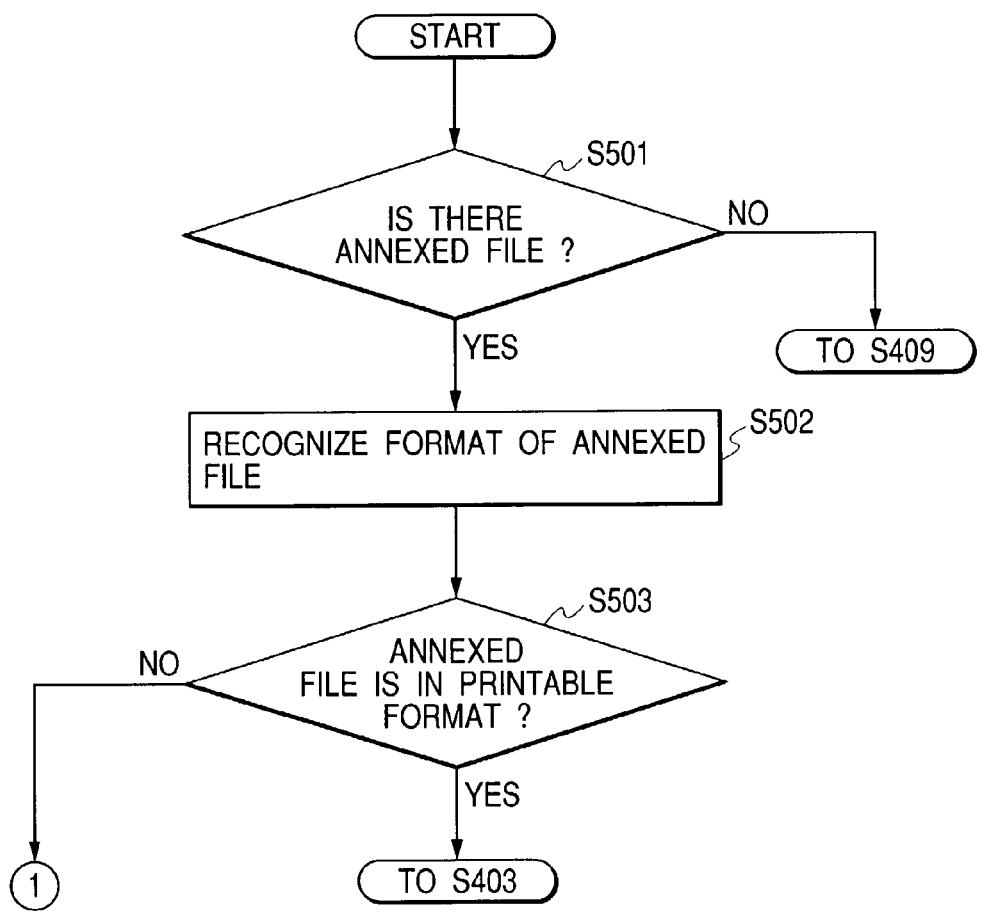
FIG. 5 is a flowchart showing a discriminating process for discriminating whether the E-mail is image data or not.

Subsequently, the process in step S402 will be described in detail. FIG. 5 is a flowchart showing the process for discriminating whether the E-mail is the image data or not. First, the E-mail recognizing unit 212 discriminates whether an annexed file exists in the received E-mail or not (step S501). In the case of the E-mail annexed with image data such as Gif format, Jpeg format, or the like, "Content-Type: multipart/mixed" or the like is described in the header. Therefore, whether the image data has been annexed or not is discriminated on the basis of such a disclosure.

If it is determined by the E-mail recognizing unit 212 that the annexed file does not exist in the received E-mail, the processing routine advances to the process in step S409 in FIG. 4 in order to discriminate whether the E-mail is the edit command of the address book or not.

If it is determined that the annexed file exists, the E-mail recognizing unit 212 subsequently executes a process for recognizing a format of the annexed file (step S502). The E-mail recognizing unit 212 discriminates whether the annexed file has a file format (for example, it indicates a format such as PostScript format, Tiff format, or the like in which an image can be developed) which can be developed by the printing apparatus 5 or not (step S503).

If it is determined that the file annexed to the E-mail has the file format which can be developed, the processing routine advances to a process for recognizing an address of the E-mail (step S403). If it is determined in step S503 that the file annexed to the E-mail has the file format which cannot be developed by the printing apparatus 5, the processing routine advances to a process for deleting the E-mail and the annexed file (step S410).

In step S406 in FIG. 4, whether the E-mail address of the transmitting source of the received E-mail address has been registered in the address book 216 or not is discriminated. If it has been registered, steps S407 and S408 follow and the printing process is executed.

However, by allowing the E-mail address whose printing process is not permitted to be registered into the address book 216, it is also possible to prevent the printing process from being executed by the E-mail of unwelcomed contents such as spam mail or the like. In this case, it is sufficient that when the E-mail address of the transmitting source of the received E-mail address is not registered in the address book 216, the processing routine advances to steps S407 and S408.

According to the embodiment as mentioned above, when the image data by the E-mail is received, the E-mail address of the transmitting source is automatically recognized and compared with the E-mail address registered in the address book 216. Only when the E-mail address of the transmitting source is the E-mail address registered in the address book 216, the image data is developed and the printing process is executed. Therefore, a situation such that the E-mail of the unwelcomed contents such as spam mail or the like is sent to the printing apparatus and contents which the user of the printing apparatus does not desire is printed can be prevented.

As mentioned above, whether the E-mail address of the transmitting source of the E-mail has been registered in the address book or not is discriminated, if it is not registered in the address book, this E-mail data is abandoned, thereby making it possible to prevent a situation such that the E-mail such as spam mail or the like which the user does not desire is unnecessarily printed. Thus, it is possible to prevent a situation such that consumables such as ink, toner, and the like, or sheets of paper are unnecessarily consumed.

By discriminating whether the image data annexed to the E-mail is the data which can be image-developed by the printing apparatus or not, it is possible to prevent a situation such that the image data which cannot be developed is forcedly processed. Owing to this, it is also possible to prevent a situation such that the consumables or sheets of paper are consumed by the vain print.

<Edit of Address Book>

An edit of the address book 216 using the E-mail will be described here. FIG. 8 will be explained again. FIG. 8 is a diagram showing an example of a format of the E-mail data for registration into the address book. As shown in the diagram, the E-mail is mainly separated into a header and a main text and contents of the edit command can be known by the header portion.

"Content-type: text/plain" exists in the header portion in FIG. 8. This means that the main text portion in FIG. 8 is character code data and, in the embodiment, it is necessary that the main text is the character code data.

"Subject: #AddAddress" in the header portion is a command for newly registering an E-mail address into the address book 216 and indicates a command for registering the mail address of the main text portion in FIG. 7 into the address book 216. Ordinarily, a title of this E-mail is inserted after "Subject:". In the printing apparatus, however, it is interpreted that the command is the edit command of the address book. A character string "#" which is inserted after the character string "Subject:" is a special character string and shows that it is the edit command for the address book 216 in distinction from the title.

In the main text portion, the E-mail address to be registered is described and a character string "Begin" is defined at the head. The main text portion further has a construction shown by the character string "Begin"+a main text message (information portion)+a character string "End". When the main text portion is recognized, the E-mail recognizing unit 212 recognizes a portion between the character string "Begin" and the character string "End" as information of the command.

That is, the format of the E-mail of the edit command of the address book 216 in the printing apparatus is constructed by the Subject portion+the main text portion. A command showing the editing operation is described in the Subject portion. Supplementary information which is necessary for the editing operation is described in the main text portion, respectively.

FIG. 9 is a diagram showing an example of a list of syntax for operating the address book 216 in the printing apparatus. E-mail for an edit comprises a Subject portion and a main text portion of the E-mail. The edit command for the address book 216 is inserted into the Subject portion. As kinds of edit commands, there are #GetAddressBook (801a), #AddAddress (802a), #ClearAddressBook (803a), #DeleteAddress (804a), #Help (805a), #AddProc (806a), #StartProc (807a), and #DeleteProc (808a). Among the edit commands, the edit command having the supplementary information which is described in the main text portion of the E-mail also exists.

The operation which is executed by each edit command will be explained hereinbelow. The #GetAddressBook command 801a denotes that a list of all users (E-mail addresses) registered in the address book 216 of the printing apparatus 5 is transmitted as return mail of the received E-mail. This instruction command does not need the main text portion (801b). Therefore, all contents described in the main text portion are ignored.

The #AddAddress command 802a is a command for adding the E-mail address designated by the main text portion is added to the address book 216. A list of the E-mail addresses to be registered into the address book 216 has been recorded in a main text portion 802b.

The #ClearAddressBook command 803a is a command for deleting the address book. When the printing apparatus 5 receives this command, all contents in the address book 216 are deleted. This command does not need a main text portion (803b).

The #DeleteAddress command 804a is a command for deleting the selected E-mail address from the address book 216. A list of the E-mail addresses has been recorded in a main text portion (804b).

The #Help command 805a is a command for a help service by the E-mail. Proper syntax for using the present E-mail system is given to the user or administrator. Contents of the help are transmitted as return mail of the received E-mail and notified.

The #AddProc command 806a is an instruction command for storing a group of instruction commands for batch-processing the instruction commands shown at 801a to 808a into the hard disk drive 208 of the printing apparatus 5. The batch process denotes that the printing apparatus of the invention processes the instruction commands in the lump.

That is, if the batch process is not used, for example, in the case where after the user of the printing apparatus 5 received the list of all users registered in the address book 216 of the printing apparatus 5, he wants to add a specific E-mail address into the address book 216, or the like, two kinds of E-mail have to be sent in a manner such that after the E-mail in which the #GetAddressBook (801a) command has been described was sent to the printing apparatus 5, the E-mail in which the #AddAddress (802a) command has been described is sent to the printing apparatus 5. However, by executing the batch process by using the #AddProc (806a) command, the #GetAddressBook (801a) command and the #AddAddress (802a) command can be processed by one kind of E-mail.

A list of instruction commands to be batch-processed is described in supplementary information 806b corresponding to the #AddProc command 806a. In the supplementary information corresponding to the #AddProc command 806a, first, unique alphanumeric characters called a ProcedureID are described. The ProcedureID is used to identify a specific command from a plurality of batch processing commands stored in the HDD 208 when the E-mail recognizing unit 212 recognizes the batch process. For this purpose, its contents have to be unique. In the embodiment, although the ProcedureID is defined as alphanumeric characters, it can be also constructed only by numerals or its size can be also predetermined. It is assumed that any contents are permitted so long as the E-mail recognizing unit 212 can recognize it.

Subsequently, the instruction commands (801a to 808a) and supplementary information (801b to 806b) corresponding to them are arranged. Since it is a feature of the batch process to process a plurality of instruction commands in the lump as mentioned above, a plurality of instruction commands can be also described as for the instruction commands (801a to 808a) which are described in the main text portion 806b. Naturally, it is also permitted that a plurality of supplementary information (801b to 806b) corresponding to the instruction commands (801a to 808a) are registered.

The #StartProc (807a) command is an instruction command for executing the batch processing command corresponding to the ProcedureID described in a main text portion 807b. When the E-mail recognizing unit 212 recognizes this instruction command, the batch processing command corresponding to the ProcedureID is read out from the HDD 208, and the read-out batch processing command is executed.

The #DeleteProc (808a) command is an instruction command for deleting information of the batch processing command corresponding to the ProcedureID described in its main text portion 808b from the HDD 208.

Figure 10:
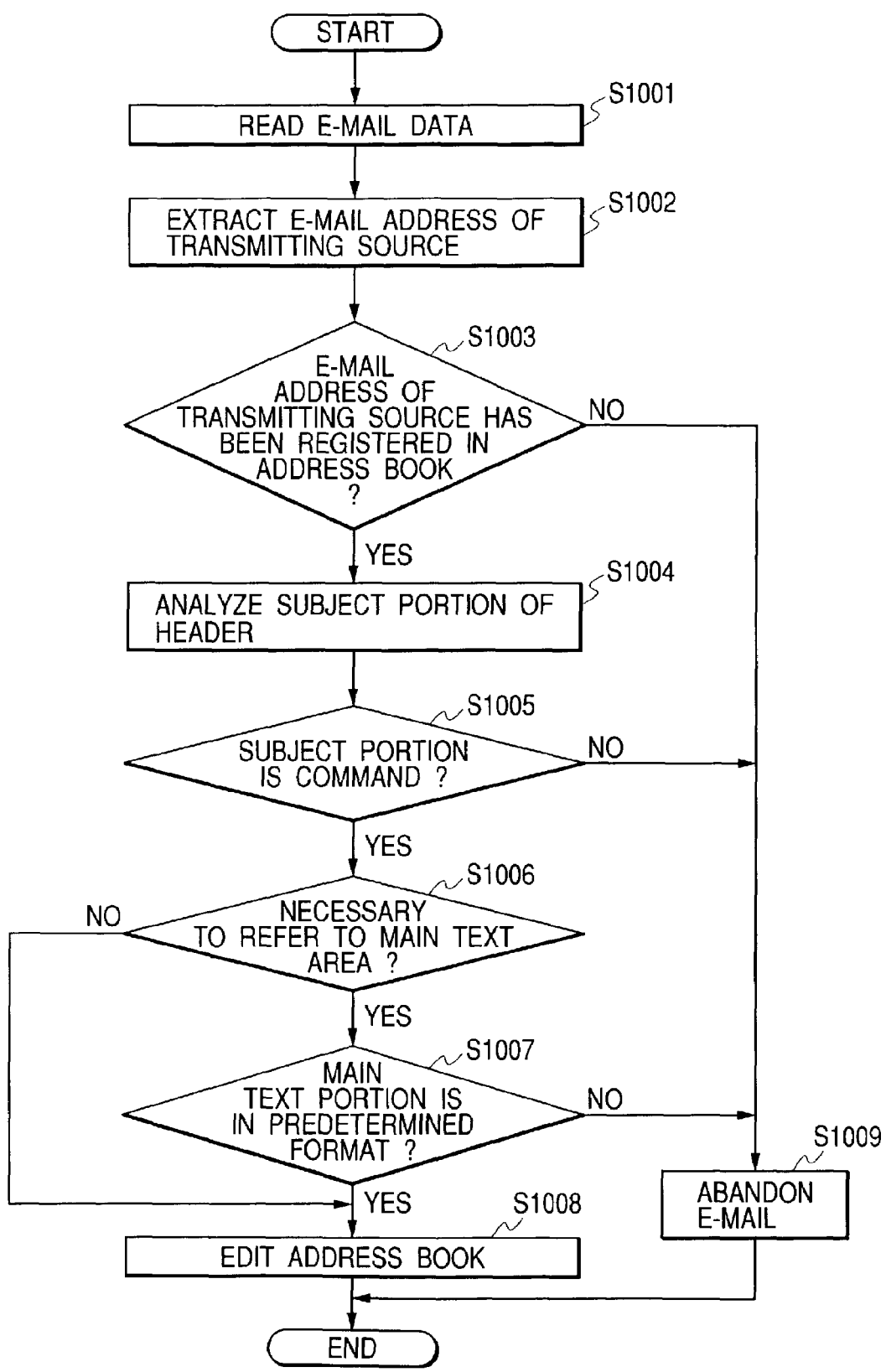
FIG. 10 is a flowchart showing an editing process of the address book 216.

Subsequently, an editing process of the address book 216 will be described. FIG. 10 is a flowchart showing the editing process of the address book 216. First, the transmitted E-mail data is read out from a transmission/reception data memory area provided in the RAM 203 (step S1001). Subsequently, the address extracting means 214 of the address book management unit 213 analyzes a header of the received E-mail data and extracts an E-mail address of the transmitting source (step S1002). Subsequently, the address editing means 215 of the address book management unit 213 compares the E-mail address extracted in step S1002 with all of the E-mail addresses stored in the address book 216, thereby discriminating whether the E-mail address extracted in step S1002 has been registered in the address book 216 or not (step S1003).

If the E-mail address extracted in step S1002 has been registered in the address book 216, the processing routine advances to a processing step of confirming contents of the E-mail. That is, the edit of the address book 216 by the E-mail is not performed by the E-mail registered in the address book 216. If the transmitting source of the E-mail is not registered in the address book 216, the E-mail data becomes invalid and is abandoned (step S1009).

Subsequently, if the transmitting source of the E-mail has been registered in the address book 216, the E-mail recognizing unit 212 analyzes the Subject portion of the header of the E-mail (step S1004). Subsequently, whether the received E-mail is mail for urging the user to edit the address book 216 or not is discriminated (step S1005). By analyzing the Subject portion of the received E-mail, the E-mail recognizing unit 212 discriminates whether the E-mail is mail for editing the address book 216 or not. If the Subject portion is the character strings shown at 801a to 805a in FIG. 8, the received E-mail is determined to be mail including the edit command.

If it is determined that the E-mail does not include the edit command of the address book 216, the E-mail is abandoned (step S1009). As a result of step S1005, if the received E-mail is determined to be the edit command of the address book 216, whether the edit command described in the E-mail is the edit command in which it is necessary to refer to the main text portion of the E-mail or not is discriminated (step S1006). This is because the edit commands 801a to 805a are classified into the commands in which the supplementary information of the edit command has been described and the commands without supplementary information in accordance with the nature of the commands.

By analyzing the Subject portion of the received E-mail, the E-mail recognizing unit 212 discriminates whether the edit command described in the Subject portion needs to refer to the main text portion of the E-mail or not.

For example, among the instruction commands described in FIG. 9, since the #GetAddressBook command (801a) and the like do not need the information described in the main text portion, the process in step S1007 is skipped.

If the command is determined to be the edit command which needs to refer to the main text portion of the E-mail, the main text portion is analyzed and whether the supplementary information has been described in a predetermined format or not is discriminated (step S1007).

If it is determined in step S1007 that the information described in the main text portion has the predetermined format, the address book 216 is edited in accordance with the command (step S1008). If the information described in the main text portion does not have the predetermined format in step S1007, since the E-mail recognizing unit 212 cannot recognize the main text portion of the E-mail, it cannot continue the process. Therefore, the E-mail data is abandoned (step S1009). As a case where the information described in the main text portion does not have the predetermined format, there is a case where a construction of the character string described in the main text portion does not comprise "Begin" and "End", a case where the main text portion is blank, a case where the character string is not described by character code data, or the like.

For example, if the received E-mail is as shown in FIG. 8, a character string of the Subject portion is #AddAddress. #AddAddress is a command for adding the E-mail address designated by the main text portion to the address book 216. Therefore, a list of the E-mail addresses which the user wants to register into the address book 216 has been stored in the main text portion in FIG. 8. The E-mail recognizing unit 212 discriminates whether the E-mail is the character code data or not by referring to the header portion of the received E-mail. If the main text portion is the character code data, a data format of the main text portion described in the header is "text/plain". Although "Content-Type: text/plain" is described in the header in FIG. 8, it means that the main text portion of the E-mail in FIG. 8 is the character code data. "Content-Type:" is a character string showing the data format in the information in the header. "text/plain" shows that the main text portion is the character code data as mentioned above.

By confirming that the main text portion of the E-mail in FIG. 8 is the character code data, the E-mail recognizing unit 212 determines that the main text portion is described in a predetermined format, and analyzes the main text portion. In the construction of the main text portion, the E-mail address which is added to the address book 216 is described between "Begin" and "End". Therefore, the E-mail recognizing unit 212 recognizes the E-mail address described between "Begin" and "End" of the main text portion of the E-mail and temporarily stores it into the RAM 203 as a work area of the software of the E-mail recognizing unit 212. After that, the address editing means 215 of the address book management unit 213 registers the E-mail address in the RAM 203 into the address book 216.

The invention is not limited to the above embodiment. For example, in the embodiment, the user who can execute the editing operation of the address book 216 is limited to a person who has the E-mail address registered in the address book 216. As another embodiment, it is also possible to construct the apparatus in a manner such that an administrator address book for the administrator of the printing apparatus 5 is separately prepared and the editing operation of the address book is permitted only by the E-mail address registered in the administrator address book.

As mentioned above, according to the embodiment, since the editing operation such that the E-mail address is registered or deleted into/from the address book can be executed by sending the E-mail to the printing apparatus 5, the managing operation of the administrator of the printing apparatus 5 can be efficiently executed.

By discriminating whether the transmitting source of the E-mail for an edit has been registered in the address book or not, a situation such that many and unspecified persons can edit the address book is prevented, the edit of the address book can be permitted only by the E-mail from a predetermined person, and the security of the address book can be enhanced.

Figure 11:
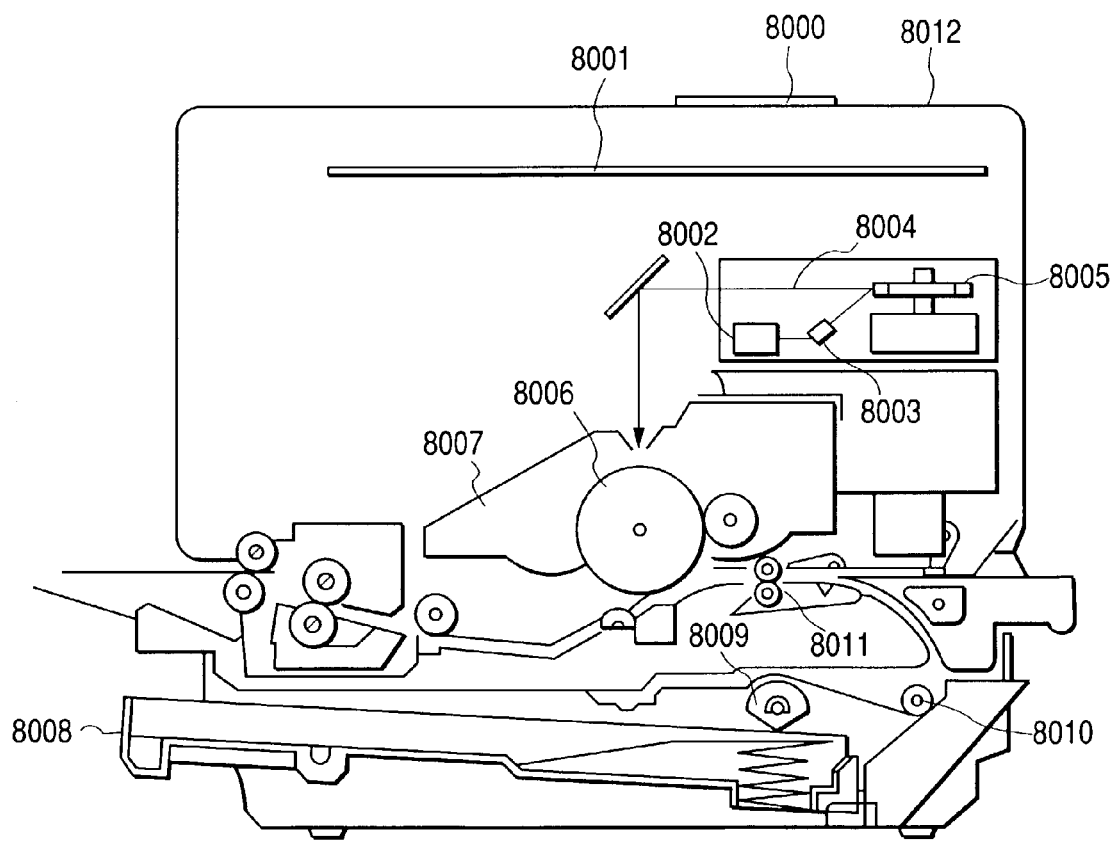
FIG. 11 is a cross sectional view showing an internal structure of a laser beam printer.

FIG. 11 is a cross sectional view showing an internal structure of a laser beam printer which can be applied to the printing apparatus 5. This laser beam printer can input character pattern data or the like and print onto recording paper. Reference numeral 8012 denotes a laser beam printer main body which forms an image onto the recording paper as a recording medium on the basis of a character pattern or the like which is supplied. Reference numeral 8000 denotes an operation panel on which switches for operation, an LED display, and the like are arranged, and 8001 indicates a printer control unit for controlling the whole laser beam printer 8012 and analyzing character pattern information or the like. The printer control unit 8001 mainly converts the character pattern information into a video signal and outputs it to a laser driver 8002. The laser driver 8002 is a circuit for driving a semiconductor laser 8003 and switches the on/off states of a laser beam 8004 which is emitted from the semiconductor laser 8003 in accordance with the inputted video signal.

The laser beam 8004 is oscillated to the right and left by a rotary polygon mirror 8005 and scans on an electrostatic drum 8006. Thus, an electrostatic latent image of the character pattern is formed on the electrostatic drum 8006. This latent image is developed by a developing unit 8007 arranged around the electrostatic drum 8006 and, thereafter, transferred onto the recording paper. Cut sheets are used as recording paper. The cut sheet recording paper is enclosed in a plurality of sheet cassettes 8008 which are attached to the laser beam printer 8012 and correspond to a plurality of kinds of sheets. The paper is fetched into the apparatus by a paper feed roller 8009 and conveying rollers 8010 and 8011 and supplied to the electrostatic drum 8006.

Figure 12:
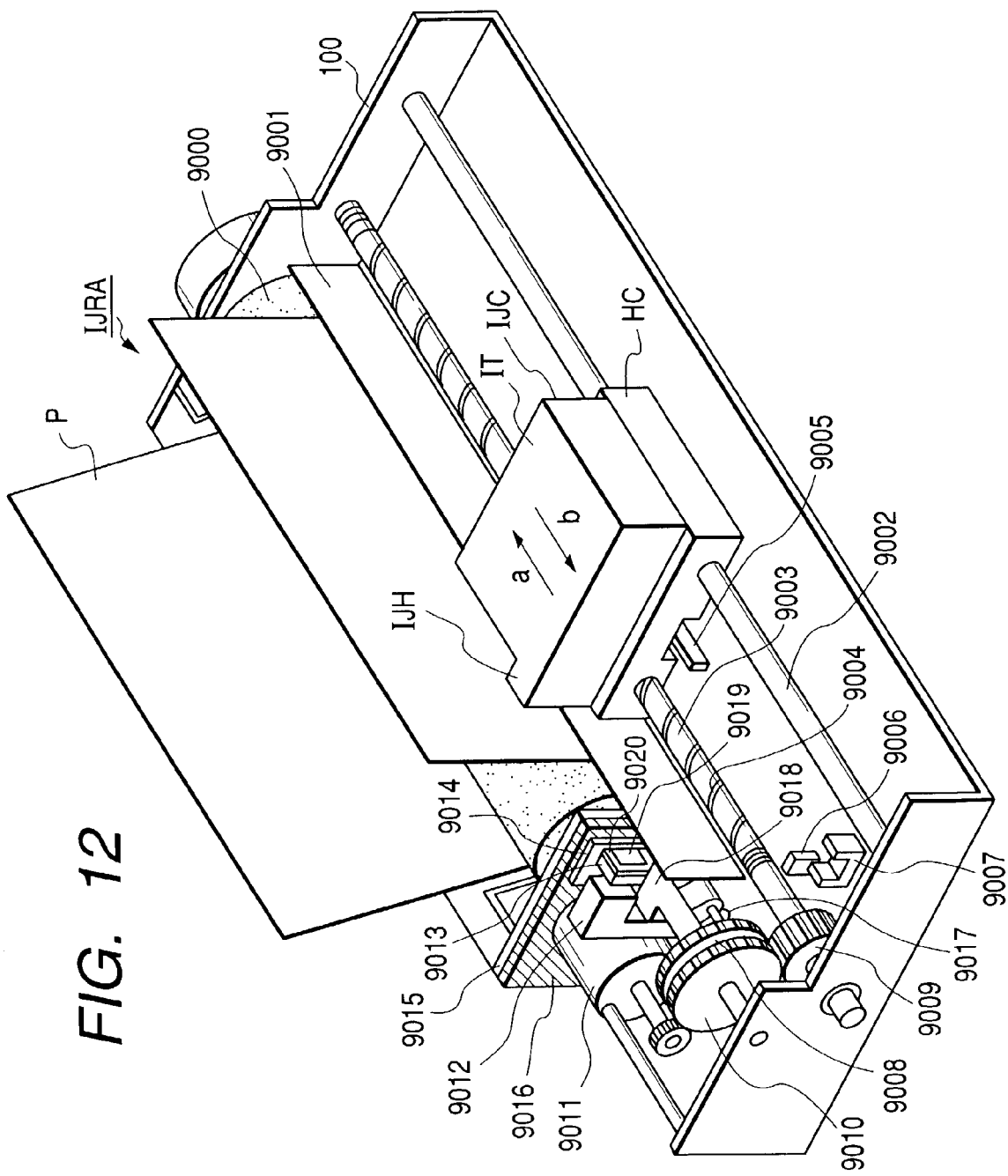
FIG. 12 is a cross sectional view of an ink-jet recording apparatus IJRA.

FIG. 12 is a cross sectional view of an ink-jet recording apparatus IJRA. In the diagram, a lead screw 9004 is rotated via driving force transfer gears 9010 and 9008 in an interlocking relational manner with the forward/reverse rotation of a driving motor 9011. A carriage HC is come into engagement with a spiral groove 9003 formed on the lead screw 9004. The carriage HC has a pin (not shown) and is reciprocated in the directions shown by arrows a and b. An ink-jet cartridge IJC is mounted on the carriage HC.

Reference numeral 9001 denotes a paper pressing plate which presses the paper onto a platen 9000 along the moving direction of the carriage.

Reference numerals 9006 and 9007 denote photocouplers serving as home position detecting means for confirming the existence of a lever 9005 of the carriage in this area and performing the switching operation of the rotating direction of the driving motor 9011, or the like. Reference numeral 9013 denotes a member for supporting a cap member 9019 for capping the front side of a recording head, and 9012 indicates sucking means for sucking the air in the cap. The sucking means 9012 performs a sucking recovery operation of the recording head via an opening 9020 in the cap.

Reference numeral 9014 denotes a cleaning blade and 9016 indicates a member for enabling the cleaning blade to be moved in the front/rear direction. The cleaning blade 9014 and the member 9016 are supported to a main body supporting plate 9015. Naturally, the blade is not limited to this structure but a well-known cleaning blade can be applied to this example. Reference numeral 9018 denotes a lever for starting the sucking operation of the sucking recovery. The lever 9018 is moved in association with the movement of a cam 9017 which is come into engagement with the carriage. A driving force which is applied from the driving motor is transferred by well-known transfer means such as a clutch switching device or the like.

The apparatus is constructed in a manner such that a desired one of the capping, cleaning, and sucking recovery operations can be executed in a position corresponding thereto by the operation of the lead screw 9004 when the carriage arrives at an area on the home position side. However, if a desired operation is executed at well-known timing, the invention can be applied to any case.

The invention is not limited to the apparatus of the embodiment mentioned above, but can be applied to a system constructed by a plurality of apparatuses or can be also applied to an apparatus comprising one equipment.

Naturally, the invention is accomplished by a method whereby a memory medium in which program codes of software for realizing the functions of the embodiment mentioned above have been stored is supplied to a system or an apparatus, and a computer (or a CPU or an MPU) of the system or apparatus reads out and executes the program codes stored in the memory medium.

Specifically speaking, program codes based on the flowcharts of FIGS. 4, 5, and 10 are stored into the ROM 102 or RAM 103 of the printing apparatus 5 and the CPU 101 of the printing apparatus 5 controls in accordance with the program codes, thereby enabling the foregoing control method to be realized.

In this case, the program codes themselves read out from the memory medium realize the functions of the embodiment mentioned above and the memory medium in which the program codes have been stored or the program codes themselves construct the invention.

As a memory medium for supplying the program codes, for example, a floppy (registered trademark) disk, a hard disk, an optical disk, a magnetooptic disk, a CD-ROM, a CD-R, a magnetic tape, a non-volatile memory card, an ROM, a DVD-RAM, or a DVD-ROM can be used. Naturally, the invention incorporates not only a case where a computer executes the read-out program codes, so that the functions of the embodiment mentioned above are realized but also a case where an OS or the like which is operating on the computer executes a part or all of actual processes on the basis of instructions of the program codes, and the functions of the embodiment mentioned above are realized by those processes.

Further, naturally, the invention incorporates a case where the program codes read out from the memory medium are written into a memory equipped for a function expanding board inserted into a computer or a function expanding unit connected to a computer and, thereafter, a CPU or the like equipped for the function expanding board or the function expanding unit executes a part or all of the actual processes on the basis of instructions of the program codes, and the functions of the embodiment mentioned above are realized by those processes.

As described above, according to the invention, whether the E-mail address of the transmitting source of the E-mail has been registered in the address book (address storing means) or not is discriminated. If it is not registered in the address book, by abandoning the E-mail data, a situation such that the E-mail such as spam mail or the like which is unwelcomed to the user is unnecessarily printed can be prevented. Thus, a situation such that the consumables such as ink, toner, and the like or the paper is unnecessarily consumed can be prevented.

By discriminating whether the image data annexed to the E-mail can be image-developed by the image processing apparatus or not, a situation such that the image data which cannot be developed is forcedly processed can be prevented. Thus, a situation such that the consumables or the paper is consumed by the vain print can be also prevented.

Since the editing operation such as registration or deletion of the E-mail address into/from the address book can be executed by sending the E-mail to the image processing apparatus, the managing operation of the administrator of the image processing apparatus can be efficiently executed.

By discriminating whether the transmitting source of the E-mail for an edit has been registered in the address book or not, a situation such that many and unspecified persons can edit the address book is prevented, the edit of the address book only by the E-mail from a predetermined person can be permitted, and the security of the address book can be enhanced.

What is claimed is:

1. A printing processing apparatus which receives E-mail from an external apparatus, comprising:
    an address storing unit that stores at least one E-mail address;
    a discriminating unit that determines whether or not an address of a transmitting source of the received E-mail is stored in said address storing unit;
    a print processing unit that, if the received E-mail includes data to be printed and it is determined by said discriminating unit that the address of the transmitting source of the received E-mail is stored in said address storing unit, executes a printing process on the basis of the data included in the received E-mail; and
    an editing unit that, if the received E-mail includes an edit command for editing contents stored in said address storing unit and it is determined by said discriminating unit that the address of the transmitting source of the received E-mail is stored in said address storing unit, edits the contents stored in said address storing unit in accordance with the edit command included in the received E-mail.

2. An apparatus according to claim 1, further comprising an image forming unit that forms an image onto a recording medium on the basis of print data,
    wherein said print processing unit forms the print data on the basis of image data annexed to the received E-mail in a file format.

3. An apparatus according to claim 1, further comprising an abandoning unit that, if it is determined by said discriminating unit that the address of the transmitting source of the received E-mail is not stored in said address storing unit, abandons the received E-mail and the data included in the received E-mail.

4. An apparatus according to claim 1, further comprising an annex discriminating unit that, if it is determined by said discriminating unit that the address of the transmitting source of the received E-mail is stored in said address storing unit, discriminating whether or not image data has been annexed to said received E-mail in a file format,
    wherein if it is determined by said annex discriminating unit that the image data has been annexed to said received E-mail, said print processing unit executes the printing process on the basis of the annexed image data.

5. An apparatus according to claim 1, further comprising a process discriminating unit that, if it is determined by said discriminating unit that the address of the transmitting source of the received E-mail is stored in said address storing unit, discriminating whether or not the data included in said received E-mail can be processed by said print processing unit,
    wherein if it is determined by said process discriminating unit that the data can be processed by said print processing unit, said print processing unit executes the printing process on the basis of the data.

6. An apparatus according to claim 1, further comprising an obtaining unit that requests E-mail whose address for a transmitting destination is a predetermined address from a mail managing apparatus connected via a network.

7. An apparatus according to claim 1, wherein said editing unit, in accordance with the edit command, adds an address in said address storing unit, deletes all contents stored in said address storing unit, or deletes a selected address from said address storing unit.

8. A printing processing apparatus which receives E-mail from an external apparatus, comprising:
    a first address storing unit that stores at least one E-mail address which is permitted to have a printing process executed on the basis of data to be printed;
    a second address storing unit that stores at least one E-mail address which is permitted to edit contents stored in the first address storing unit;
    a first discriminating unit that determines whether or not an address of a transmitting source of the received E-mail is stored in said first address storing unit;
    a print processing unit that, if the received E-mail includes data to be printed and it is determined by said first discriminating unit that the address of the transmitting source of the received E-mail is stored in said first storing unit, executes the printing process on the basis of the data included in the received E-mail;
    a second discriminating unit that determines whether or not an address of a transmitting source of the received E-mail is stored in said second address storing unit; and
    an editing unit that, if the received E-mail includes an edit command for editing contents stored in said first address storing unit and if it is determined by said second discriminating unit that the address of the transmitting source of the received E-mail is stored in said first address storing unit, edits contents stored in said first address storing unit in accordance with the edit command included in the received E-mail.

9. A printing processing apparatus which receives E-mail from an external apparatus, comprising:
    a first address storing unit that stores at least one E-mail address which is not permitted to execute a printing process on the basis of data to be printed;
    a second address storing unit that stores at least one E-mail address which is permitted to edit contents stored in said first address storing unit;
    a first discriminating unit that determines whether or not an address of a transmitting source of the received E-mail is stored in said first address storing unit;
    a print processing unit that, if the received E-mail includes data to be printed and it is determined by said first discriminating unit that the address of the transmitting source of the received E-mail is not stored in said first storing unit, executes the printing process on the basis of the data included in the received E-mail;

a second discriminating unit that determines whether or not the address of the transmitting source of the received E-mail is stored in said second storing unit; and an editing unit that, if the received E-mail includes an edit command for editing contents stored in said first storing unit and it is determined by said second discriminating unit that the address of the transmitting source of the received E-mail is stored in said second address storing unit, edits the contents stored in said first address storing unit in accordance with the edit command included in the received E-mail.

10. An apparatus according to claim 9, further comprising an abandoning unit that, if it is determined by said first discriminating unit that the address of the transmitting source of the received E-mail is stored in said first address storing unit, abandons the received E-mail and the data included in the received E-mail.

11. An apparatus according to claim 9, further comprising an annex discriminating unit that, if it is determined by said first discriminating unit that the address of the transmitting source of the received E-mail is not stored in said first address storing unit, determines whether or not image data has been annexed to said received E-mail in a file format, wherein if it is determined by said annex discriminating unit that the image data has been annexed, said print processing unit executes the printing process on the basis of the image data.

12. An apparatus according to claim 9, further comprising a process discriminating unit that, if it is determined by said first discriminating unit that the address of the transmitting source of the received E-mail is not stored in said first address storing unit, determines whether or not the data included in said received E-mail can be processed by said print processing unit, wherein if it is determined by said process discriminating unit that the data can be processed by said print processing unit, said print processing unit executes the printing process on the basis of the data.

13. An apparatus according to claim 9, wherein said editing unit, in accordance with the edit command, adds an address to said first address storing unit, deletes all contents stored in said first address storing unit, or deletes a selected address from said first address storing unit.

14. A printing processing method of a printing processing apparatus for executing a printing process on the basis of data included in E-mail, comprising the steps of:

the printing apparatus receiving E-mail from an external apparatus;

the printing apparatus discriminating whether or not an address of a transmitting source of the received E-mail is stored in an address memory area for storing at least one E-mail address;

if the received E-mail includes data to be printed and if it is discriminated that the address of the transmitting source of the received E-mail is stored in said address memory area, the printing processing apparatus executing the printing process on the basis of the data included in the received E-mail; and if the received E-mail includes an edit command for editing contents stored in said address memory area and if it is discriminated that the address of the transmitting source of the received E-mail is stored in said address memory area, the printing processing apparatus editing the contents stored in said address memory area in accordance with the edit command included in the received E-mail.

15. A printing processing method of a printing processing apparatus for executing a printing process on the basis of data included in E-mail, comprising the steps of:

the printing processing apparatus receiving E-mail from an external apparatus;

the printing processing apparatus discriminating whether or not an address of a transmitting source of the received E-mail is stored in a first address memory area for storing at least one E-mail address which is not permitted to execute a printing process on the basis of data to be printed;

if the received E-mail includes data to be printed and if it is discriminated that the address of the transmitting source of the received E-mail is not stored in said first address memory area, the printing processing apparatus executing the printing process on the basis of the data included in the received E-mail;

discriminating whether or not an address of a transmitting source of the received E-mail is stored in a second address memory area for storing at least one address of E-mail which is permitted to edit contents stored in said first memory address area; and if the received E-mail include an edit command for editing contents stored in said first address memory area and if it is discriminated that the address of the transmitting source of the received E-mail is stored in said second address memory area, the printing processing apparatus editing contents stored in said first address memory area in accordance with the edit command included in the received E-mail.

16. A computer-readable storage medium on which is stored a computer-executable program for controlling a printing processing apparatus which receives E-mail from an external apparatus and has an address storing unit for storing at least one E-mail address, wherein said program causes a computer to execute:

a receiving step of receiving E-mail from the external apparatus;

a discriminating step of discriminating whether or not an address of a transmitting source of the received E-mail is stored in said address storing unit;

a print processing step of, if the received E-mail includes data to be printed and if it is discriminated in said discriminating step that the address of the transmitting source of the received E-mail is stored in said address storing unit, executing a printing process on the basis of the data included in the received E-mail; and an editing step of, if the received E-mail includes an edit command for editing contents stored in said address storing unit and if it is discriminated in said discriminating step that the address of the transmitting source of the received E-mail is stored in said address storing unit, editing the contents stored in the address storing unit in accordance with the edit command included in the received E-mail.

17. A computer-readable storage medium on which is stored a computer-executable program for controlling printing processing apparatus which receives E-mail from an external apparatus, wherein said program causes a computer to execute:

a receiving step of receiving E-mail from the external apparatus;

a first discriminating step of discriminating whether or not an address of a transmitting source of the received E-mail is stored in a first address storing unit for storing at least one E-mail address which is not permitted to execute a printing process on the basis of data to be printed;

a print processing step of, if the received E-mail includes data to be printed and if it is discriminated in said first discriminating step that the address of the transmitting source of the received E-mail is not stored in said first address storing unit, executing a printing process on the basis of the data included in the received E-mail;

a second discriminating step of discriminating whether or not the address of the transmitting source of the received E-mail is stored in a second address storing unit for storing at least one address of E-mail which is permitted to edit contents stored in said first address storing unit; and an editing step of, if the received E-mail includes an edit command for editing contents stored in said first address storing unit and if it is discriminated in said second discriminating step that the address of the transmitting source of the received E-mail is stored in said second address storing unit, editing the contents stored in said first address storing unit in accordance with the edit command included in the received E-mail.

* * * * *

UNITED STATES PATENT AND TRADEMARK OFFICE
CERTIFICATE OF CORRECTION

PATENT NO.         : 7,287,059 B2                                    Page 1 of 1
APPLICATION NO. : 10/281196
DATED                : October 23, 2007
INVENTOR(S)       : Shono It is certified that error appears in the above-identified patent and that said Letters Patent is hereby corrected as shown below:

COLUMN 8:
Line 8, "is added" should be deleted.

COLUMN 16:
Line 23, "E-mail include" should read -- E-mail includes --.

Signed and Sealed this

Seventeenth Day of June, 2008

JON W. DUDAS
*Director of the United States Patent and Trademark Office*